June 10, 1969     T. T. STAPLETON     3,449,742
DIGITIZER SYSTEM
Filed May 4, 1965
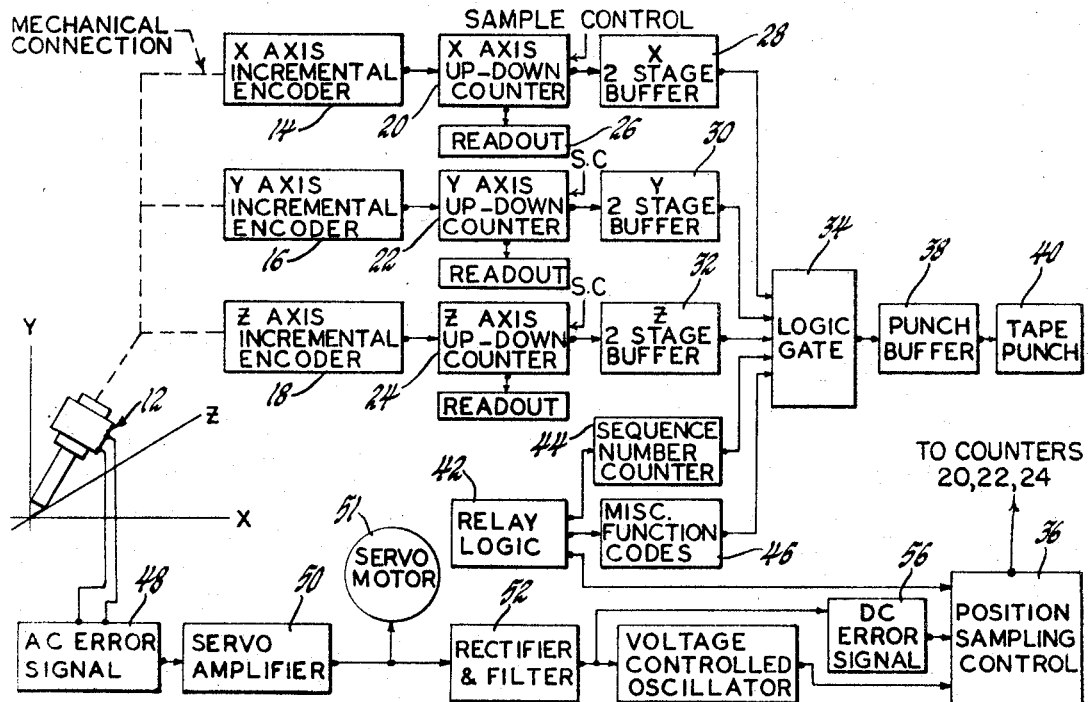
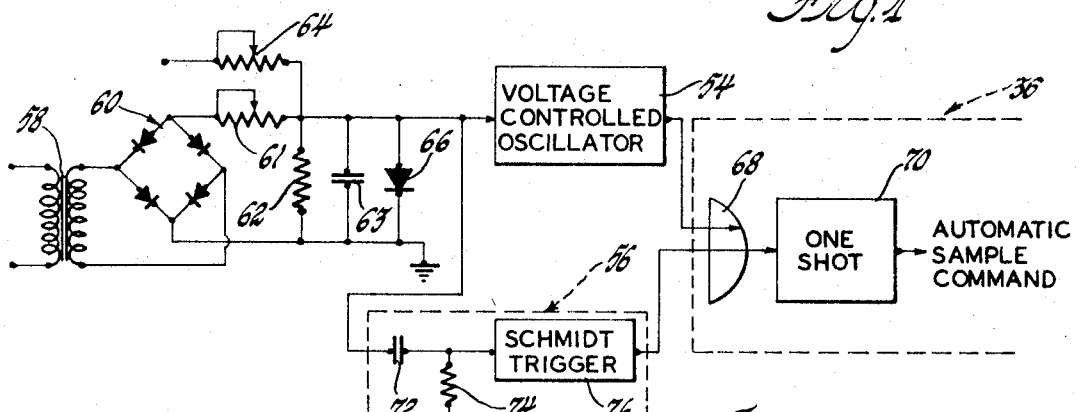
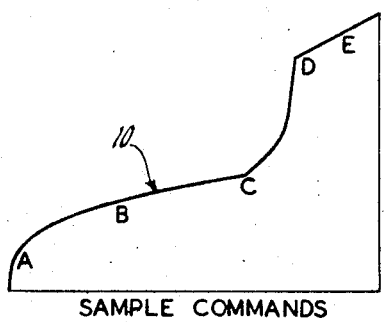
INVENTOR.
Thomas T. Stapleton
BY
Hugh L. Fischer
ATTORNEY

United States Patent Office 3,449,742
Patented June 10, 1969

3,449,742
DIGITIZER SYSTEM
Thomas T. Stapleton, Clawson, Mich., assignor to General Motors Corporation, Detroit, Mich., a corporation of Delaware
Filed May 4, 1965, Ser. No. 453,163
Int. Cl. H04l 3/00; G08c 9/00, 11/00
U.S. Cl. 340—347                        3 Claims

ABSTRACT OF THE DISCLOSURE

A sampling rate control for surface contour tracers. A tracer probe is moved over the surface in contact therewith, probe position data is accumulated and sampled periodically. As the probe experiences rapid deflection due to rapidly changing surface contour, the sampling rate is increased to obtain increased position data in the area of rapidly changing contour.

---

This invention relates to apparatus for scanning a surface for the purpose of generating a record of the contour thereof and more particularly to apparatus for controlling the rate at which contour information is sampled for recording as a function of the degree of contour.

Systems for scanning a surface for the purpose of generating a record of the contour of the surface may be of either the digital or analog type. Either type of system may include a scanner or tracer which is displaceable over the surface according to a predetermined plan. In a digital system, displacement of the scanner along one or more axes may be monitored and digital signals generated therefrom to indicate the contour of the surface as a function of the total number of increments of displacement experienced within a particular time period.

To make a permanent recording of the surface for purposes of reproduction or for other purposes, the digital signal may be periodically sampled and entered onto a recording medium such as a paper tape. Assuming that the scanner is displaced over the surface during the scanning process at a constant speed, it is desirable to vary the sample rate according to the degree of contour of the surface adjacent the scanner; i.e., the greater the contour, the higher should be the scanning rate in order to accurately record the surface. Therefore, extremely high degrees of contour evidenced by very small radii of curvature may be accurately recorded by closely spacing the information samples. Similarly, abrupt discontinuities in the surface, such as corners and edges, should also be specifically sampled and recorded to avoid loss of information.

According to the present invention, the rate at which accumulated signals representing the total displacement of a scanner over a surface are sampled may be controlled according to the degree of contour of the surface proximate the scanner. Wherever the degree of contour of the surface proximate the scanner is great, as evidenced by a small radius of curvature, the sampling rate is automatically increased. In general this is accomplished by the combination of a scanner which is displaceable over a surface to be analyzed and means for producing and accumulating signals representing the total number of increments of displacement of the scanner along at least one axis. To control the rate at which the accumulated signals are sampled, means are provided for producing a signal which varies in character according to the degree of contour of the surface proximate the scanner. Such a signal may be applied to suitable means for controlling a sampler such that the rate at which the sampler reviews the accumulated signal information varies according to the character of the signal representing the contour.

In accordance with the invention, any abrupt discontinuities in the surface such as edges and corners may be specifically detected and recorded. In a specific embodiment of the invention this is accomplished through the combination of a scanner which is displaceable over the surface to be analyzed and means for producing signals which, when accumulated, represent the total displacement of the scanner along at least one axis of the scanner. To control the sampling of the accumulated signals, detector means are provided for producing a signal which is related in character to the degree of contour of the surface proximate the scanner. Additional means, such as a differentiator, are provided to produce a signal whenever the rate of change in the character of the signal representing contour exceeds a predetermined value. This signal may be applied to a sampler means to command the taking of a sample upon the occurrence of the particular signal representing a discontinuity in the surface under analysis.

The invention may be best understood by referring to a specific embodiment thereof. The description of a specific embodiment is given in the following specification which is to be taken with the accompanying figures of which:

FIGURE 1 is a block diagram of a specific embodiment of the invention adapted to record digital signals representing the contour of a three-dimensional surface;

FIGURE 2 is a partly schematicized block diagram of a portion of the circuit shown in FIGURE 1 but in somewhat greater detail; and FIGURE 3 is an example of a surface contour which may be analyzed by the systems shown in FIGURES 1 and 2.

Referring specifically to the figures, it may be desirable to record in digital form the surface 10 of a model such as that shown in FIGURE 3. In practice this may be accomplished by a preprogrammed or manual tracing or scanning of surface 10 from left to right at various depths normal to the drawing surface. This scanning operation is accomplished with the aid of a tracer or scanner such as generally indicated at 12 in FIGURE 1. The scanner 12 may suitably be of the type described in U.S. Patent Re. 25,648, assigned to Pegasus Laboratories, Inc. of Berkley, Michigan. This scanner has a head which simulates a milling tool head and is displaceable relative to the scanner body. The scanner 12 may be mounted for freedom of movement along each of the three mutually orthogonal axes X, Y, and Z by means of carriages such as will be apparent to those skilled in the art. The scanner 12 and the associated axial moving mechanism may be suitably connected to a plurality of incremental encoders 14, 16, and 18 which produce digital signals corresponding to increments of displacement along the three axes X, Y, and Z, respectively. As such, the encoders 14, 16, and 18 function as analog to digital conversion devices. Depending, of course, upon the nature of the surface being analyzed, a suitable increment to be represented in digital form may be .001 inch. The signals from encoders 14, 16, and 18 representing the increments of displacement of scanner 12 along the respective X, Y, and Z axes are conveyed to X, Y, and Z axes counters 20, 22, and 24, respectively. The counters function to accumulate the signals and thus to present a total count of the accumulated number of increments of displacement of the scanner 12 along the particular axes. The counters may be provided with means to furnish a visual indication of the accumulated count. Such visual readout means is indicated at 26.

The accumulated count in the counters 20, 22, and 24 is fed through two-stage buffers 28, 30, and 32 to a logic gate 34. The logic gate 34 operates under the control of a sampling control unit 36 to gate, in sequence, the information from the counters to a punch buffer 38 and from the buffer 38 to a paper tape punch 40. The two-stage storage buffers 28, 30, and 32 are provided in the channels for the X, Y, and Z axes, respectively, to allow sampling of the information in the counters while a count is being made and further to allow the punching of two points in rapid succession. The sampling control unit 36 functions to control the logic gate 34 such that the information from the counters is gated sequentially digit by digit and axis by axis into the combination of buffer 38 and punch 40. The output of the punch 40 is a punched paper tape containing coordinate information of successive points scanned by the scanner 12. The tape output from 40 may be used to directly drive a numerically controlled milling machine over a similar path.

Other information may also be sequentially gated through gate 34 into the tape punch 40. For example, relay logic 42 may be provided to furnish information indicating left and right extremes of the displacement of scanner 12 across the surface 10 as shown in FIGURE 3. The output of the relay logic 42 may be connected to a sequence number counter 44 which provides a digital signal indicating the number in sequence of the left to right sweep of scanner 12 over surface 10. Similarly, various other data may be provided by miscellaneous code unit 46 for entering onto the tape output from 40.

An inspection of the surface 10 shown in FIGURE 3 indicates that the degree of contour of the surface 10 varies widely over the surface. For example, the degree of contour at the surface area generally designated by A is relatively great whereas the degree of contour at the surface areas represented by B and E is relatively small. Further, the surface 10 includes such abrupt discontinuities as are indicated generally at C and D. Therefore, in order to ensure that the surface 10 is accurately recorded, it is desirable to vary the rate at which the counters 20, 22, and 24 are sampled according to the degree of curvature of the surface 10. It is thus desirable to make samplings at a higher rate along the portion of surface 10 indicated at A and at a comparatively lower rate along the portion of surface 10 indicated at E. Similarly, it is desirable to make a specific indication of the presence of the discontinuities at C and D regardless of whether such discontinuities would be encountered by the scanner 12 at what would normally be a sampling time.

To accomplish the automatic control of the sampling rate in accordance with the objectives previously outlined the scanner is equipped with a servo type position control system 48, 50, 51 which produces an AC error signal representing the displacement of the scanner head from a null position. This displacement is caused by changes in the coordinate values of the surface proximate the scanner 12 as it is moved over the surface. The control includes three transducers, such as linear differential transformers, corresponding to the X, Y, and Z axes, to produce displacement signals. These signals are summed to represent total displacement and compared with a reference signal at 48 to produce an AC signal representing the displacement of scanner 12 relative to surface 10 required to null out the error. Due to the nature of the scanner servo system, this error signal is a function of the degree of contour of surface 10 proximate scanner 12. Further, the signal is amplified at 50 and applied to a servo motor 51 to alter the direction of movement of scanner 12 to reduce the error signal to zero. Since the magnitude of the error signal generated by the position control system 48, 50, and 51 when the scanner 12 is displaced over the surface 10 at a predetermined constant speed is inversely proportional to the radius of curvature of the surface proximate the scanner, this signal may be used as a measure of the degree of contour of the surface 10.

To so utilize the AC signal produced by unit 48, the signal is filtered and rectified at 52 to provide a DC error signal which varies in magnitude according to the degree of contour of surface 10 proximate the scanner 12. The DC error signal is applied to the voltage controlled oscillator 54 so as to control the frequency of the output signal from the oscillator 54. This output signal is applied to the sampling control unit 36 to vary the sampling rate according to the magnitude of the DC error signal produced by the combination 48, 50, and 52. Accordingly, as the error signal increases in magnitude, indicating a greater degree of contour of surface 10 proximate the scanner 12, the frequency of the output of voltage controlled oscillator 54 is increased, hence increasing the rate at which the counters 20, 22, and 24 are sampled.

The operation of the AC error signal in controlling the sampling rate may be described in greater detail by reference to FIGURE 2. In FIGURE 2, the AC error signal is applied across transformer 58 to a diode rectifier 60. The DC output of rectifier 60 is applied across a variable resistor 61 to an RC filter comprising parallel connected resistor 62 and capacitor 63 which effectively smooths out the signal for application to the voltage controlled oscillator 54. The output signal from oscillator 54 may, for example, vary between one and seven cycles per second. The minimum output frequency of oscillator 54 may be controlled by a DC bias applied to the oscillator across a variable resistor 64. Similarly, a Zener diode 66 may effectively determine the maximum voltage applied to oscillator 54 and hence determine the maximum frequency of the output. The output of the oscillator 54 is applied to the first input of an OR gate 68 which forms a part of the sampling control unit 36 as shown. The output of the OR gate 68 is applied to a one shot multivibrator 70 which effectively generates sample command signals upon the occurrence of each output of OR gate 68.

Referring again to FIGURE 1, the DC error signal which is applied to the voltage controlled oscillator 54 is also applied to discontinuity detector 56 which, in turn, is connected to the sampling control unit 36. The unit 56 functions to detect the rate of change of the magnitude of the DC signal and to provide an output signal when the rate of change exceeds a predetermined value. This value is such as to indicate the presence of abrupt discontinuities of surface 10 such as C and D shown in FIGURE 3.

Referring again to FIGURE 2, the function of the discontinuity detector may be described in greater detail. The DC error signal is applied to a differentiating circuit consisting of a series capacitor 72 and a shunt resistor 74. This differentiating circuit is effective to produce a voltage spike corresponding to the rate of change of the DC signal. This voltage spike is applied to a Schmitt trigger circuit 76 which produces an output whenever the voltage spike exceeds a predetermined value. The output of the Schmitt trigger circuit is applied to another input of the OR gate 68, thus to also control the operation of the one shot multivibrator 70. Accordingly, whenever an abrupt discontinuity is encountered by the scanner 12, the position control system generates an error signal in the form of an AC error signal which is rectified and filtered to produce a DC signal which varies abruptly in magnitude. This abrupt variation is sensed by the differentiating circuit 72, 74 and used to produce an output signal which commands the taking of a sample of the contact of counters 20, 22, and 24, thus indicating the coordinate position of the discontinuity.

It is to be understood that the foregoing description relates only to a specific embodiment of the invention and is not to be construed as limiting the invention. For a definition of the invention reference should be had to the appended claims.

I claim:

1. In combination with apparatus for determining the contour of a surface including a scanner displaceable over the surface, means producing signals representing increments of displacement of the scanner along at least one axis and accumulator means for storing and producing signals on command representing the total displacement of the scanner along said axis; control means for controlling the sampling of the contents of the accumulator means comprising detector means for producing a DC signal related in magnitude to the degree of contour of the surface proximate the scanner, means including a differentiator and a trigger circuit connected to the detector means for producing an output signal when the rate of change of the DC signal exceeds a predetermined value, and sampler means operatively connected to the last mentioned means for sampling the contents of the accumulator means upon the occurrence of an output signal from the last mentioned means.

2. In combination with apparatus for determining the contour of a surface including a scanner displaceable over the surface, means producing signals representing increments of displacement of the scanner along at least one axis and accumulator means for storing and producing signals on command representing the total displacement of the scanner along said axis, control means for controlling the rate at which signals from the accumulator means are sampled comprising detector means for producing a DC signal related in magnitude to the degree of contour of the surface proximate the scanner, oscillator means responsive to the DC signal for producing a first output signal at a frequency dependent upon the magnitude of the DC signal, sampler means for sampling the contents of the accumulator means upon the occurrence of input signals applied thereto, means connected to the detector means for producing a second output signal when the rate of change of the DC signal exceeds a predetermined value, and logic means operatively connecting the last mentioned means and the oscillator means to the sampler means for providing input signals to the sampler means upon the occurrence of the first and second output signals.

3. In combination with apparatus for determining the contour of a surface including a scanner displaceable over the surface, means producing signals representing increments of displacement of the scanner along at least two axes, and individual accumulator means for storing and producing signals on command representing the total displacement of the scanner along each of the axes, control means for controlling the rate at which signals from the accumulator means are sampled comprising detector means for producing a DC signal related in magnitude to the degree of contour of the surface proximate the scanner, oscillator means responsive to the DC signal for producing a first output signal at a frequency dependent upon the magnitude of the DC signal, sampler means for sampling the contents of each of the accumulator means upon the occurrence of input signals applied thereto, means connected to the detector means for producing a second output signal when the rate of change of the DC signal exceeds a predetermined value, and logic means operatively connecting the last mentioned means and the oscillator means to the sampler means for providing input signals to the sampler means upon the occurrence of the first and second output signals.

References Cited

UNITED STATES PATENTS

| | | | |
|---|---|---|---|
| 2,698,410 | 12/1954 | Madsen et al. | 346—33 |
| 2,833,941 | 5/1958 | Rosenberg et al. | 307—149 |
| 2,996,348 | 8/1961 | Rosenberg | 318—19 |
| 3,072,833 | 1/1963 | Kerr et al. | 318—162 |
| 3,217,331 | 11/1965 | Wetzel et al. | 318—162 |
| 3,302,209 | 1/1967 | Fengler | 318—162 |

MAYNARD R. WILBUR, *Primary Examiner.*

W. W. NIELSEN, *Assistant Examiner.*

U.S. Cl. X.R.

318—162; 346—33